Nov. 16, 1937.                    A. M. FLEMING                    2,099,107
ADJUSTABLE SEAT
Filed Dec. 5, 1935
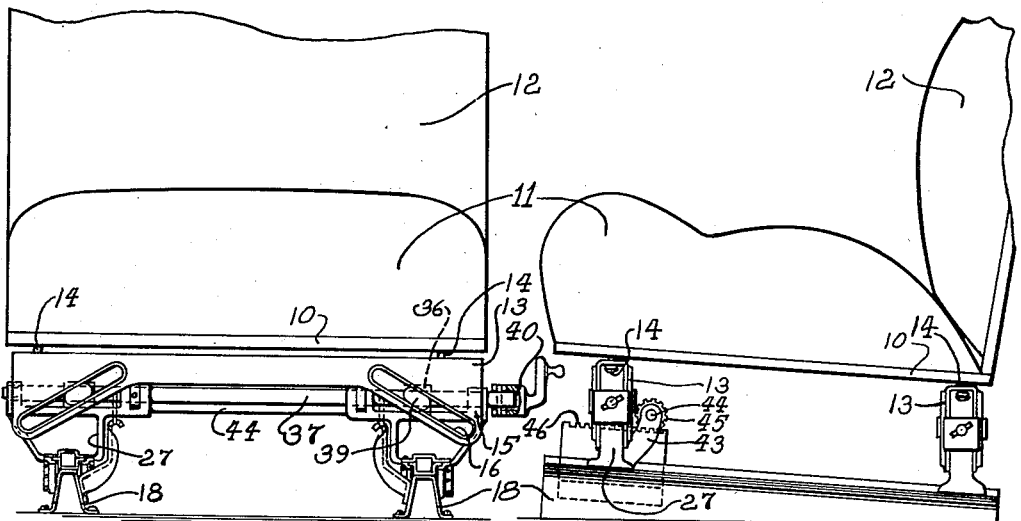
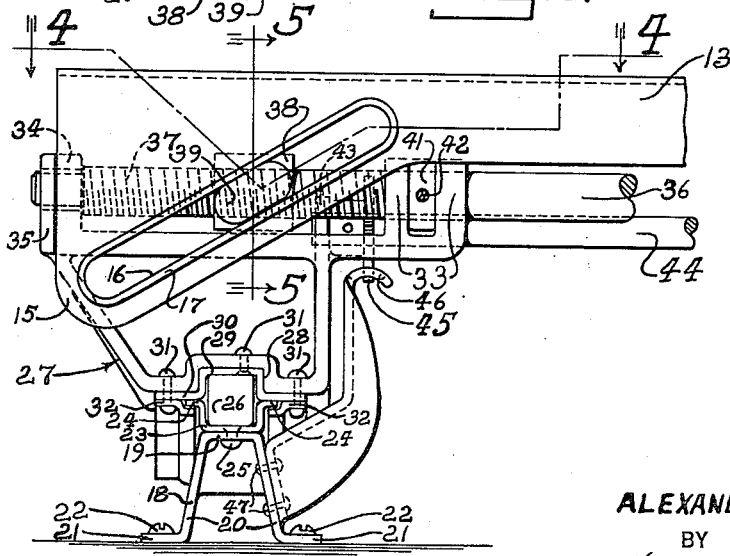
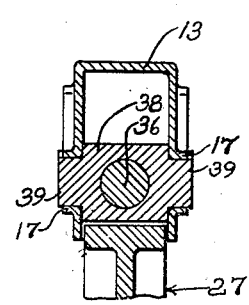
INVENTOR
ALEXANDER M. FLEMING.
BY
ATTORNEYS Patented Nov. 16, 1937

2,099,107

UNITED STATES PATENT OFFICE 2,099,107

ADJUSTABLE SEAT

Alexander M. Fleming, Detroit, Mich., assignor to Chrysler Corporation, Highland Park, Mich., a corporation of Delaware Application December 5, 1935, Serial No. 52,946

5 Claims. (Cl. 155—88)

This invention relates to an adjustable seat, and more particularly to a seat adapted for motor vehicles.

Among the objects of the present invention are the provision of a seat structure which may be adjusted forwardly and backwardly to provide a comfortable position for the occupants; to provide means for maintaining the structure in a predetermined adjusted position; to provide a seat structure which may be raised and lowered and tilted forwardly and backwardly according to the requirements of the occupants; and to provide a seat structure which may be freely adjusted as aforesaid without binding of the parts.

More specifically the invention has for one of its objects the provision of improved means for moving the seat forwardly and backwardly, and additional means, operable independently of the first means, for both raising and lowering the seat and tilting the same forwardly and backwardly.

Another object of the invention is the provision of a seat which may be adjusted with a minimum of effort and which may be economically produced.

Other objects and advantages of the invention will be more apparent from the following description taken in connection with the accompanying drawing, in which:

Fig. 1 is a front elevational view of a seat mounted according to the invention.

Fig. 2 is an end elevational view of a seat mounted according to the invention.

Fig. 3 is an enlarged front, fragmentary elevational view illustrating the seat adjusting mechanism shown in Fig. 1.

Fig. 4 is a sectional view taken on the line 4—4 of Fig. 3.

Fig. 5 is a sectional view taken on the line 5—5 of Fig. 3.

Referring to the drawing, the numeral 10 designates a seat frame having horizontal and vertical supports for the seat proper and back respectively which are preferably so constructed as to be operated in unison. Secured to the frame 10 are the conventional seat cushion and back 11 and 12 respectively. A pair of transversely extending channel members 13 are fastened to the frame 10, one adjacent each of the front and rear edge portions thereof, by bolts 14. The end portions of the sides of the members 13 project downwardly, as at 15, beyond the intermediate part thereof and formed therein are inclined slots 16, the slots in the fore and aft members preferably being in longitudinal alignment. The slots 16 are formed by cutting away a portion of the metal, the edges of the metal adjacent the slots being flanged outwardly as at 17 to provide an increased bearing surface for the purpose hereafter explained.

The seat structure above described is adapted to be supported by and moved longitudinally upon a suitable base, the latter including a pair of longitudinally extending, transversely spaced side rails 18. These rails are preferably channel members inverted so that the flat base 19 thereof is spaced from the floor by the legs 20, the free ends of the latter being flanged outwardly as at 21 to receive bolts 22 for securing the rails to the floor of the vehicle. A channel member 23 having the free longitudinal edges thereof flanged outwardly as at 24 is secured to each of the rails by rivets 25. A pair of rollers 26 in spaced relation is rotatably supported in each of the members 23 for moving the seat structure forwardly and rearwardly.

Positioned between the seat structure and the rails are four supports, generally designated by the numeral 27, one of such supports being positioned adjacent each end of the channel members 13 so that a pair thereof, arranged in spaced relation registers with each of the rails 18 and is supported for longitudinal movement by the rollers 26. Inasmuch as the supports 27 embody the same construction, only one is herein described in particular.

The bottom of each support 27, as viewed in Fig. 3, has a longitudinally extending channel 28 registering with a rail 18 in which is disposed a channel member 29 having oppositely extending side flanges 30 overlapping the adjacent face of the support. The channel portion of the member 29 rests upon and is movably supported by a roller 26. Bolts or rivets 31 secure the member 29 to the support 27, one of such bolts engaging the channel portion of the members and an additional bolt securing each of the side flanges 30 to the adjacent face of the support 27 and also retaining a plate 32 in position against each flange 30, the inner ends of each plate 32 overlapping a flange 24 of a channel member 23.

Referring particularly to Figs. 3 and 4 of the drawing, each of the supports 27 at the right or inner end thereof is provided with a pair of upwardly extending spaced ears 33, while the left or outer end thereof has a single ear 34, a portion of the latter, as at 35, having a greater width than the channel member 13. The enlarged portions 35 of the transversely aligned supports 27 retain the associated channel member 13 against endwise movement. Journaled in the ears 33 and 34 of each pair of transversely aligned supports 27 is a shaft 36, the end portions thereof received in the ears 34 being of reduced diameter. A shaft 36 is located at the front and the rear edge portions of the seat and registers with a similarly disposed channel member 13. Each of the shafts 36 has threaded sections 37 on its respectively opposite end portions, on each section of which is threaded a nut 38 having lugs 39 projecting from a pair of opposite sides and disposed in an inclined slot 16 in the end portions of the channel member 13. The flanged edges 17 of the metal adjacent the slots provide an increased bearing surface for these lugs. Each shaft 36 has a manually operable crank 40 for rotating the same.

Carried by each of the shafts 36 are collars 41, one of which is disposed between each pair of ears 33 of the support 27. These collars are adapted to be fixed to the shaft by a set screw 42 so that undesirable endwise movement of the shaft is prevented, and the latter is adjustable longitudinally, within limits, with respect to the supports 27 where such adjustment may be found necessary due to wear of some part of the mechanism.

Projecting from the rearwardly disposed side of the two supports 27 positioned at the front edge of the seat, as viewed in Fig. 2, are ears 43 in which are journaled the respectively opposite end portions of a transversely extending shaft 44 on which is non-rotatably secured a pinion 45. A rack 46 is suitably secured by bolts or rivets 47 to the forwardly disposed portions of each rail 18, the pinions 44 meshing with a respective rack 46. Upon rotation of the shaft 44 by means of a crank (not shown) similar to the crank 40, the seat structure, channel members 13, supports 27 and mechanism carried thereby are moved forwardly or rearwardly upon the rollers 26.

In operation, the seat structure is moved vertically by rotation of the cranks 40 on the shafts 36. Rotation of the cranks in one direction causes the nuts 38 to be moved inwardly toward each other, the lugs 39 sliding in their respective slots 16, thereby allowing the seat structure to be lowered in position. This particular movement of the nuts results from the fact that one end portion of the shafts 36 has right hand screw threads while the opposite end portion has left hand screw threads. Opposite rotation of the cranks accordingly moves the nuts outwardly, thereby raising the seat. During the above described movement only the seat frame 10, together with the seat 11 and back 12, and channel members 13 are moved.

Each of the shafts 36 is independently operated by its respective crank 40 and the seat proper may be placed at any desired inclination either forwardly or rearwardly. Inasmuch as the seat back is attached to the seat frame, the back is accordingly varied in position as the seat proper is moved.

What I claim is:

1. An adjustable seat including a base structure, a pair of longitudinally spaced channel members on the front and rear edge portions of said seat respectively, each of said channel members including a pair of downwardly extending flanges having registering inwardly inclined slots therein, a nut member disposed between the flanges of each channel member and having projections extending into the slots thereof, a shaft journaled in said base structure and in threaded engagement with the nuts at the edge portions of said seat respectively, and means rotating each of said shafts for independently varying the elevation of the front and rear portions of said seat.

2. An adjustable seat including a vertically shiftable seat support having depending flanges provided with registering inclined slots adjacent each end portion, a base structure, a shaft journaled in said structure, members movably mounted on said shaft each having a portion disposed in one pair of registering slots respectively for supporting said seat support, and means for rotating said shaft for moving said members relative to said slots to vary the position of said seat vertically.

3. An adjustable seat including a member having spaced depending wall portions, said wall portions having transversely aligned inclined slots, a base structure, a shaft journaled in said base structure and having threaded portions extending between said wall portions, a nut member in threaded engagement with said shaft and having end portions extending into said slots respectively for adjustably supporting said first named member, and means for rotating said shaft for moving said nut member relative to said slots to vary the position of said seat vertically.

4. An adjustable seat including a vertically shiftable seat support having spaced depending flanges, said flanges having transversely aligned inclined slots adjacent each end portion of said support, a base structure, nut members movably mounted on said base structure and disposed between said depending flanges, each of said nut members having a portion extending into one of said slots, and apparatus for moving said nut members relative to said slots to vary the position of said seat vertically.

5. An adjustable seat including a vertically shiftable seat support having spaced depending flanges, said flanges having transversely aligned inclined slots adjacent each end portion of said support, a portion of the walls of said slots being flanged, a base structure, nut members movably mounted on said base structure and disposed between said depending flanges, each of said nut members having a portion extending into one of said slots, and engaging the flanged wall portion thereof, and apparatus for moving said nut members relative to said slots to vary the position of said seat vertically.

ALEXANDER M. FLEMING.